(No Model.) 6 Sheets—Sheet 2.

J. WURSTER.
FEEDING DEVICE FOR SAWING MACHINES.

No. 421,803. Patented Feb. 18, 1890.

(No Model.) 6 Sheets—Sheet 3.
J. WURSTER.
FEEDING DEVICE FOR SAWING MACHINES.
No. 421,803. Patented Feb. 18, 1890.
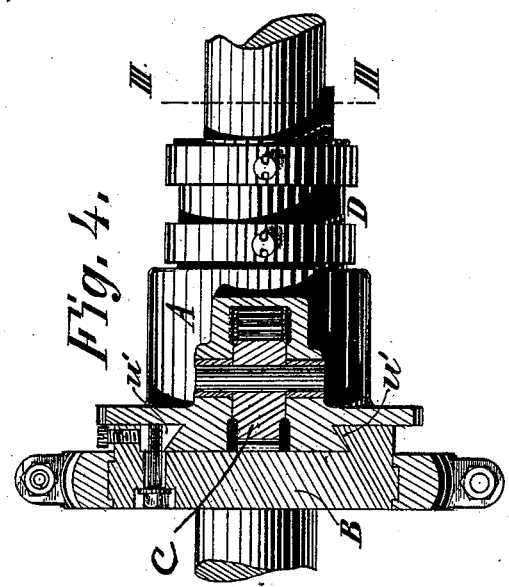
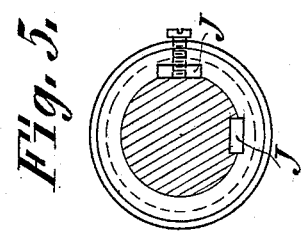
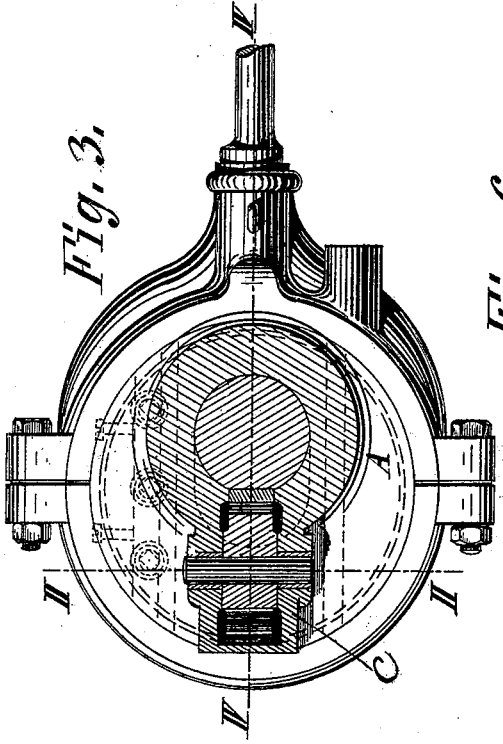
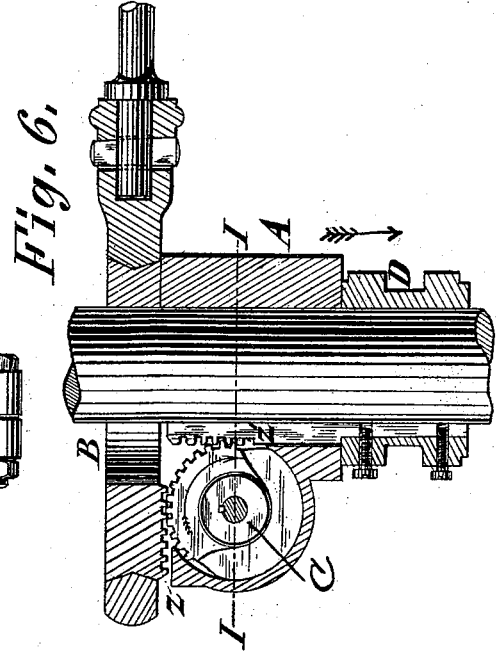
Witnesses
W. P. Keene
F. L. Middleton
Inventor
Julius Wurster
by Ellis Spear
Atty.

(No Model.) 6 Sheets—Sheet 4.
J. WURSTER.
FEEDING DEVICE FOR SAWING MACHINES.
No. 421,803. Patented Feb. 18, 1890.

Witnesses
Inventor
Julius Wurster (No Model.) 6 Sheets—Sheet 5.

J. WURSTER.
FEEDING DEVICE FOR SAWING MACHINES.

No. 421,803. Patented Feb. 18, 1890.

Witnesses
W. P. Keene
F. L. Middleton

Inventor:
Julius Wurster.
By Ellis Spear
Atty.

N. PETERS, Photo-Lithographer, Washington, D. C.

(No Model.) 6 Sheets—Sheet 6.

J. WURSTER.
FEEDING DEVICE FOR SAWING MACHINES.

No. 421,803. Patented Feb. 18, 1890.

Witnesses
W. T. Keene
F. L. Middleton

Inventor
Julius Wurster
by Ellis Spear
Atty.

UNITED STATES PATENT OFFICE.

JULIUS WURSTER, OF DERENDINGEN, NEAR TÜBINGEN, GERMANY.

FEEDING DEVICE FOR SAWING-MACHINES.

SPECIFICATION forming part of Letters Patent No. 421,803, dated February 18, 1890.

Application filed October 16, 1889. Serial No. 327,212. (No model.)

*To all whom it may concern:*

Be it known that I, JULIUS WURSTER, of Derendingen, near Tübingen, in the Kingdom of Würtemberg and German Empire, have invented new and useful Improvements in Feeding Devices for Sawing-Machines, of which the following is a specification, reference being had therein to the accompanying drawings.

My invention relates to means for regulating the feeding apparatus of frame-sawing machinery. In such machinery the feeding-rollers which carry the log forward are intermittently rotated from a friction or other wheel which is moved at each upward stroke of the frame, and this friction or other wheel is generally moved from an eccentric or crank on the driving-shaft. To enable me to give a greater or less amount of feed to the log or logs, I arrange means whereby the stroke of the eccentric or crank can be easily altered, and if need be while the saws are at work.

The accompanying drawings illustrate the improvements.

Figure 1:
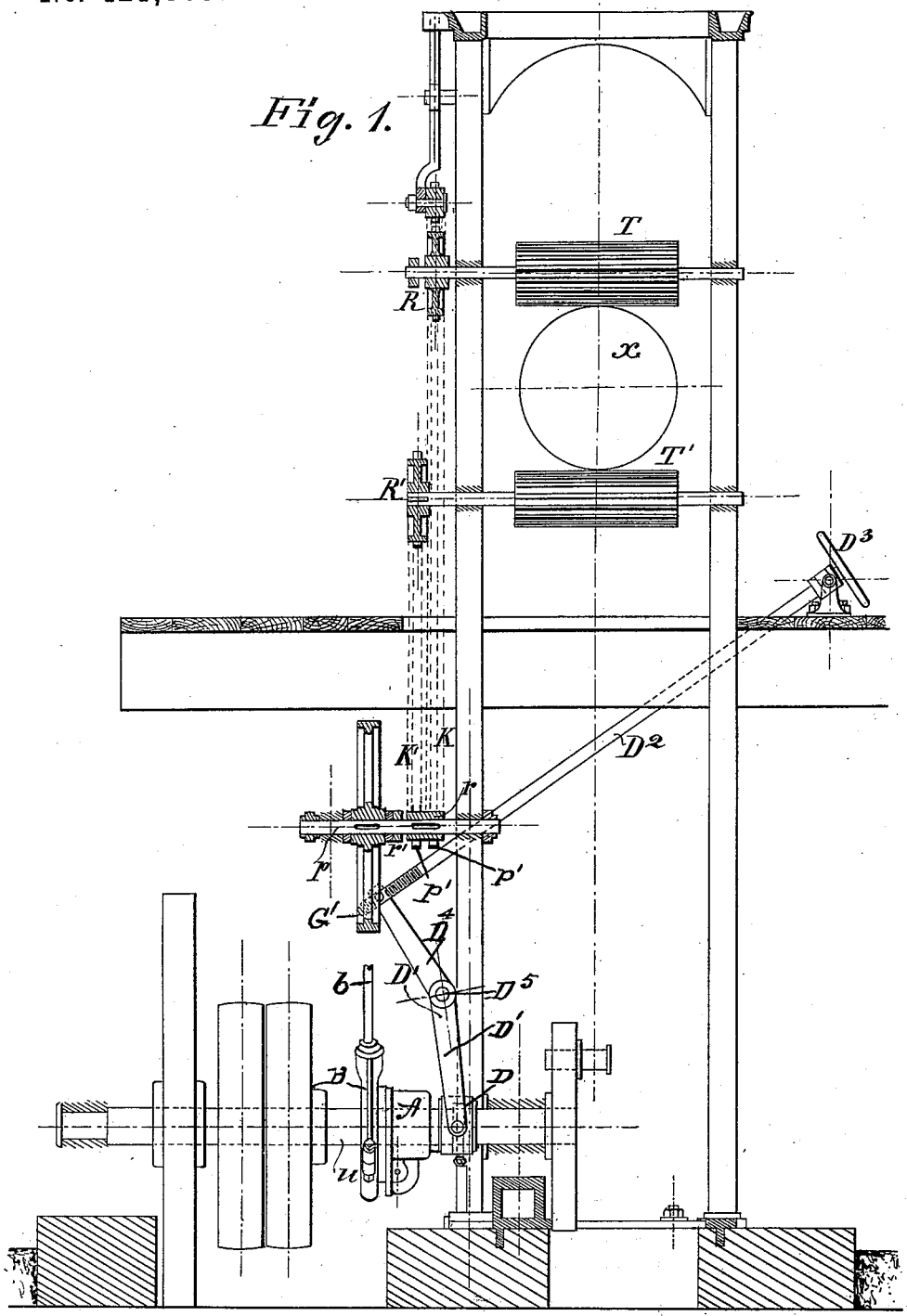
Figure 2:
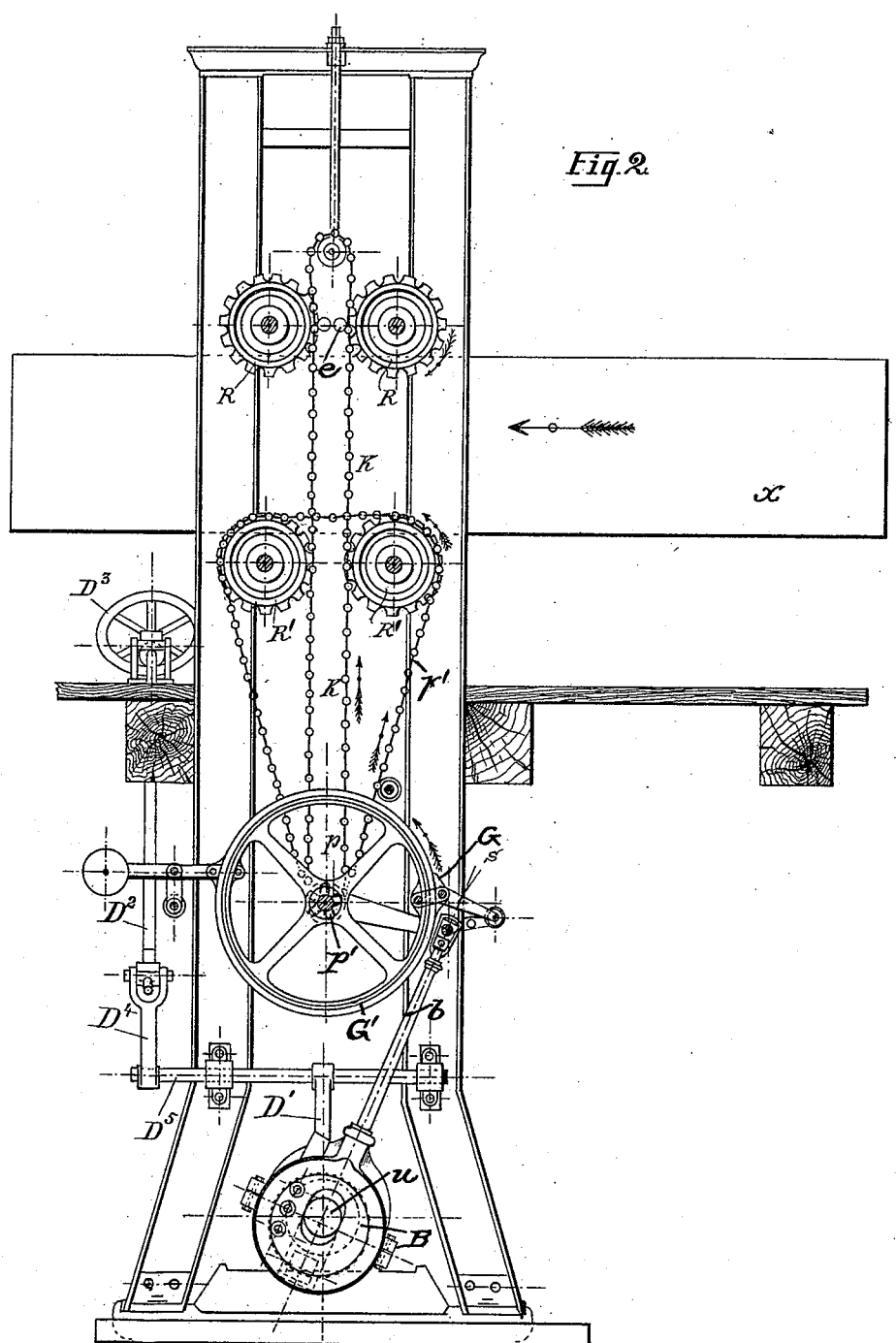
Figure 9:
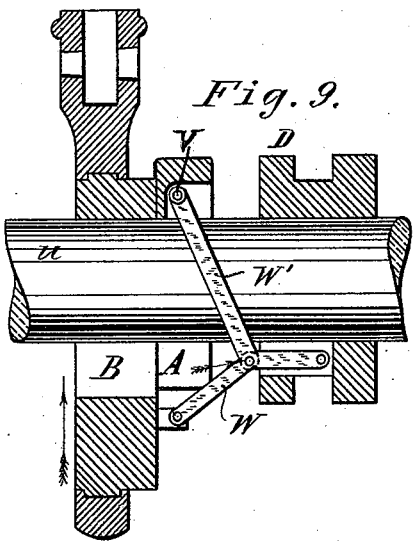
Figure 8:
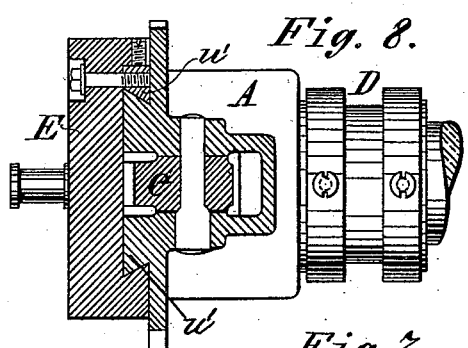
Figure 7:
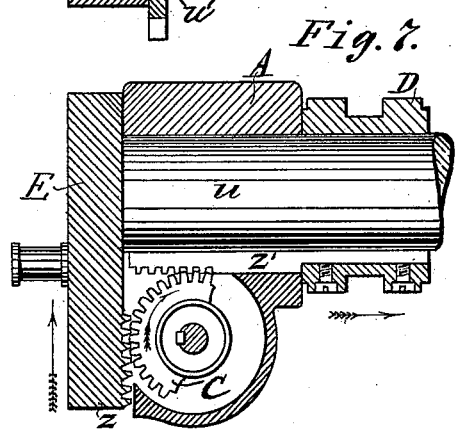
Figure 13:
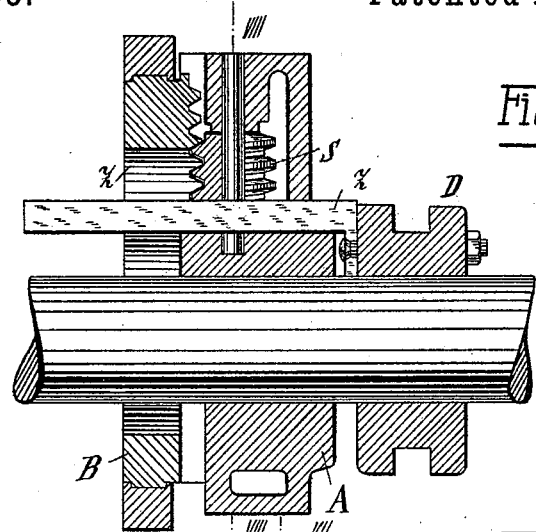
Figure 14:
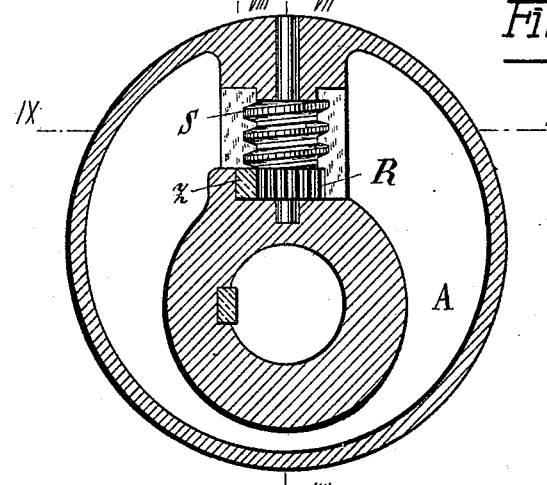
Figure 15:
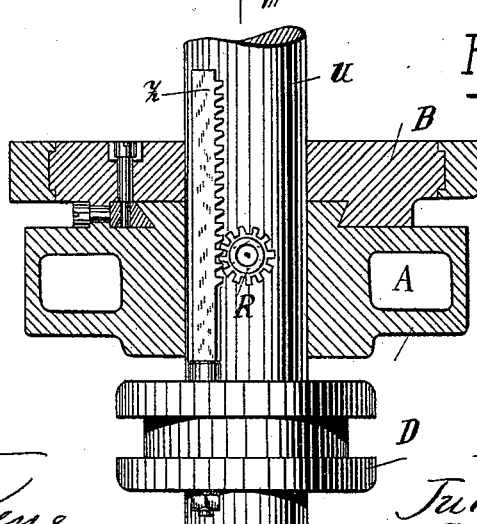

Figure 1 is an end view of the chief parts of a frame-sawing machine to which my improvements are applied. Fig. 2 is a side view of the same. Fig. 3 is a detail view showing the main driving-shaft in section, with the eccentric mounted thereon, with part of the operating means in section. Fig. 4 is a sectional view of the same on line II II. Fig. 5 is a view of Fig. 4 on line III III. Fig. 6 is a view of Fig. 3 on line IV IV. Figs. 7 and 8 are views of one modification; Fig. 9, a view of a second modification, and Figs. 10, 11, and 12 views of a third modification. Figs. 13, 14, and 15 show a fourth modification.

Referring to Fig. 1, $u$ is the driving-shaft, and B the eccentric driven thereby. I provide a boss A, which is fixed on the shaft $u$. On the boss A the eccentric B is carried in slides $u'$ $u'$. (See Fig. 4.) The eccentric has teeth $z$, which gear with a toothed sector C, Sheet 3, which is carried in the boss A, the said toothed sector also gearing with a sliding rack $z'$, which slides in the boss A and is fixed to a clutch-collar D, the result being that when the clutch D is moved, say, in the direction of the arrow, Fig. 6, the rack $z'$ moves the sector C, and the sector C moves the eccentric B or alters its position relatively to the shaft $u$ in such a manner that the stroke is increased or diminished at will.

Referring now to Sheet 2 of the drawings, it will be seen that the eccentric B is connected by the usual link $b$ to a slipper-block G, which moves the friction-wheel G' in the usual manner. Chain-pinions $p'$ $p'$ on the shaft $p$ drive the wheels R R and R' R' by means of the chains K K', and thus move the feed-rollers T T', which are fixed on the same spindles as the wheels R R R' R'. The chain K is kept in gear with the wheels R by means of guide-rollers $e$ $e$, Fig. 2. The log, which is represented at $x$, is thus moved through the sawing-machine. When it is desired to alter the feed, I operate the hand-wheel $D^3$ and thus rotate the spindle $D^2$, the screwed end of which engages with a nut in the lever $D^4$, which thus moves the rock-shaft $D^5$ and consequently the forked lever D', which engages with the clutch D and so moves the rack $z'$, so as to alter the throw of the eccentric, as already described.

I will now refer to the illustrated modifications of my invention.

Figs. 7 and 8 show the improvements in connection with a crank instead of an eccentric. In these views the parts are the same as in the foregoing figures, except that the eccentric B is replaced by a crank E, which is carried in slides $u'$ $u'$ on the face of the boss A. By moving the clutch D the rack $z'$ rotates the sector C, which engages with the teeth $z$ on the back of the crank, and thus shifts the position of the crank and crank-pin in precisely the same manner as in the case of the eccentric.

In Fig. 9 I dispense with the rack and sector and use toggle-levers W W', which are both connected to a link on the clutch D. The lever W is joined to the sliding eccentric B and the lever W' is connected at V to the boss A. On moving the clutch D the center at V remains fixed and the lever W, acting on the eccentric B, alters its position relatively to the shaft $u$.

Figure 10:
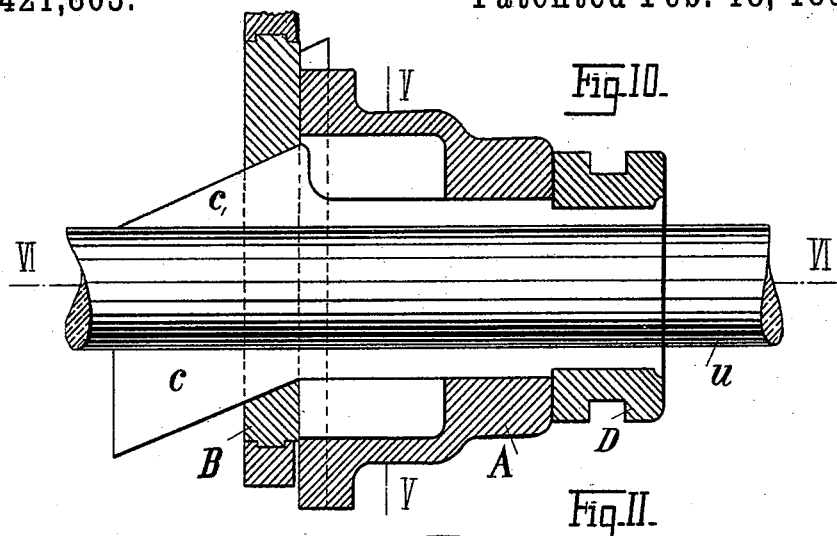
Figure 11:
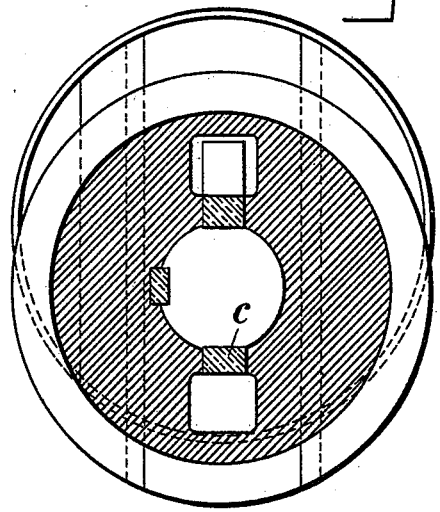
Figure 12:
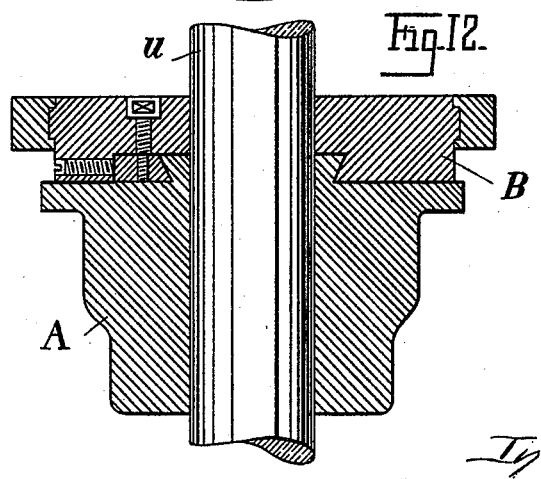

Figs. 10, 11, and 12 show another modification, in which the movement of the sliding eccentric B on the boss A is gained by means of inclines C C', which are slid on the shaft U by means of the clutch D. The section at Fig. 11 is taken at the line V, Fig. 10, and the section at Fig. 12 is taken at the line VI, Fig. 11.

Another modification is shown at Figs. 13, 14, and 15 of the drawings. Fig. 13 is a section of Fig. 14 at the line VII, and Fig. 14 is a section of Fig. 13 at the line VIII. In this case a worm S is mounted in the boss A, the said worm S gearing with teeth $z'$, formed on the back of the eccentric B. Beneath the worm and fast on the same spindle is a toothed pinion R, which gears with a sliding rack $z$, carried on the clutch D and capable of being moved thereby to and fro. The worm S is thus revolved and correspondingly moves the eccentric B with the results already set forth. It will be seen that in all of the modifications the alteration of the eccentric or cranks is effected from the movement of the clutch D, this movement of the clutch being obtained in the manner set forth with reference to Figs. 1 and 2.

What I claim, and desire to secure by Letters Patent of the United States, is—

1. In combination, the feed-rolls T T', the friction-wheel G', the gripping-block G, engaging with said wheel, the main shaft $u$, the eccentric B, adjustably mounted thereon and connected with the block by means of the link $b$, the sliding collar D, with operating-connections to the eccentric, the lever D' on the rock-shaft $D^5$ and engaging with the collar D, the lever $D^4$, also on the rock-shaft, said lever being connected with the screw-operating rod, substantially as described.

2. In combination, the feed-rolls, the main shaft, the eccentric or disk mounted on said shaft, driving-connections leading from said eccentric or disk, the collar D, and operating-connections extending therefrom to the eccentric for adjusting it, said connections consisting of the wedges engaging with the eccentric, substantially as described.

In witness whereof I have hereunto set my hand in presence of two witnesses.

JULIUS WURSTER.

Witnesses:
CHRISTIAN BAUER,
KARL SCHULER.